United States Patent

Lincoln et al.

[15] 3,675,000

[45] July 4, 1972

[54] APPARATUS FOR ARITHMETIC OPERATIONS BY ALERTING THE CORRESPONDING DIGITS OF THE OPERANDS

[72] Inventors: Andrew J. Lincoln, Concord; Karl S. Menger, Cambridge, both of Mass.

[73] Assignee: Sperry Rand Corporation

[22] Filed: Aug. 6, 1970

[21] Appl. No.: 61,527

[52] U.S. Cl. ..........235/168, 235/174

[51] Int. Cl. ..........G06f 7/50

[58] Field of Search ..........235/168, 174, 92, 92 CP, 92 SA, 235/92 CM, 92 MC

[56] References Cited

UNITED STATES PATENTS

| | | | |
|---|---|---|---|
| 3,394,249 | 7/1968 | Abernathy et al. | 235/168 X |
| 3,454,310 | 7/1969 | Wilhelm, Jr. | 235/152 X |
| 3,375,358 | 3/1968 | Franck | 235/168 X |
| 3,571,573 | 3/1971 | Ott | 235/92 |

*Primary Examiner*—Malcolm A. Morrison
*Assistant Examiner*—David H. Malzahn
*Attorney*—S. C. Yeaton

[57] ABSTRACT

Apparatus for arithmetically combining the values of two numbers, for example adding and subtracting, comprising a first shift register for storing one of the numbers with stages interconnected to diminish the values of the digits of the one number by predetermined amounts, respectively, as the digits thereof transfer between the stages. A second shift register for storing the other number is included for increasing the values of the digits of the other number corresponding to the digits of the one number, respectively, by the corresponding predetermined amounts, as the digits of the other number transfer between the stages thereof. The digits of the other number are increased until the corresponding digits of the one number attain the values zero, respectively.

28 Claims, 5 Drawing Figures

INVENTORS
ANDREW J. LINCOLN
KARL S. MENGER
BY
H P Terry
ATTORNEY

INVENTORS
ANDREW J. LINCOLN
KARL S. MENGER
BY
H P Terry
ATTORNEY

INVENTORS
ANDREW J. LINCOLN
KARL S. MENGER
BY
HP Terry
ATTORNEY

APPARATUS FOR ARITHMETIC OPERATIONS BY ALERTING THE CORRESPONDING DIGITS OF THE OPERANDS

BACKGROUND OF THE INVENTION

1. Field of the Invention

The present invention pertains to arithmetic circuits particularly suitable for use in electronic decimal digital computers of the desk calculator type.

2. Description of the Prior Art

Electronic desk calculators are known in the prior art for arithmetically combining decimal numbers entered into the machines by means of associated keyboards. The digits of the decimal numbers are usually represented by binary codes such as, for example, the conventional binary coded decimal representation. The arithmetic circuits for such calculators usually include at least two registers and an arithmetic unit. One of the registers is conventionally an accumulator for storing the cumulative arithmetic results of the calculator. The other register is commonly an operand register for storing the number entered via the keyboard to be arithmetically combined with the number stored in the accumulator register. The two numbers are conventionally applied to the arithmetic unit wherein they are combined in accordance with the operation key depressed by the operator and the new arithmetic result is transferred back into the accumulator register.

For example, addition may be performed by entering a number into the operand register by means of the keyboard and thereafter depressing the ADD key thus causing the entered number to be added to the number stored in the accumulator register by means of the arithmetic unit.

It is desirable in the present day electronic desk calculator art to instrument the machines in accordance with the modern large scale integrated circuit technology, often referred to as LSI. For example, when utilizing metal oxide silicon-field effect transistors (MOS-FET) to implement the circuits of a calculator, it is a primary object of practitioners in the discipline to provide all of the calculator circuits on a single semiconductor chip. Such monolithic construction is desirable for reasons of manufacturing economy. Additionally, it is preferable, for reasons of component uniformity, to maintain the area of the monolithic calculator chip at a minimum.

It is well known in the integrated circuit technology that the chip area is proportional to the number of component elements on the chip and the complexity of the circuit. For example, a read only memory circuit is of lowest complexity and a shift register circuit is somewhat more complex. Other circuits such as the arithmetic units conventionally utilized in desk calculators, as described above, are of even greater complexity.

Random logic circuits are relatively complex because of the complex interconnection patterns required between the logic elements thereof. In the integrated circuit technology it is desirable to minimize the number of interconnecting leads that cross over one another since lead crossovers require expensive processing techniques compared to circuits having a minimum of crossover points. The layout arrangement of the complex interconnecting leads of a random logic circuit to minimize crossovers necessitates the excessive chip areas resulting in the associated high complexity.

Since conventional arithmetic units may comprise hundreds or even thousands of components and the complexity associated therewith may be relatively high, it may be appreciated that electronic calculator circuits utilizing conventional arithmetic units may require impractically large chip areas.

Conventional arithmetic units suffer from the further disadvantage that the complex interwiring necessitated thereby often requires an excessive number of distal connections further increasing the chip size requirements. In addition, the conventional calculator arithmetic circuits usually require large numbers of input, output and control leads further complicating the chip construction.

SUMMARY OF THE INVENTION

The present invention provides desk calculator arithmetic circuits that do not require the complex arithmetic units of prior art designs. The circuits of the present invention are instrumented utilizing primarily shift registers having relatively low complexity.

The operand register of the present invention comprises a shift register for storing the digits of the operand entered into the calculator by means of the keyboard. The stages of the operand register are interconnected to diminish the values of the digits of the operand by predetermined amounts, respectively, as the digits transfer between the stages. The accumulator register of the present invention comprises a shift register for storing the cumulative results of the arithmetic operations performed by the calculator. The stages of the accumulator are interconnected for increasing the values of the digits of the cumulative result stored therein as the digits transfer therebetween. The digits of the cumulative result are increased by the respective predetermined amounts corresponding to the amounts by which the digits of the operand are decreased. The digits of the cumulative result are increased until the corresponding digits of the operand attain the values zero, respectively.

DESCRIPTION OF THE PREFERRED EMBODIMENT

Figure 1A:
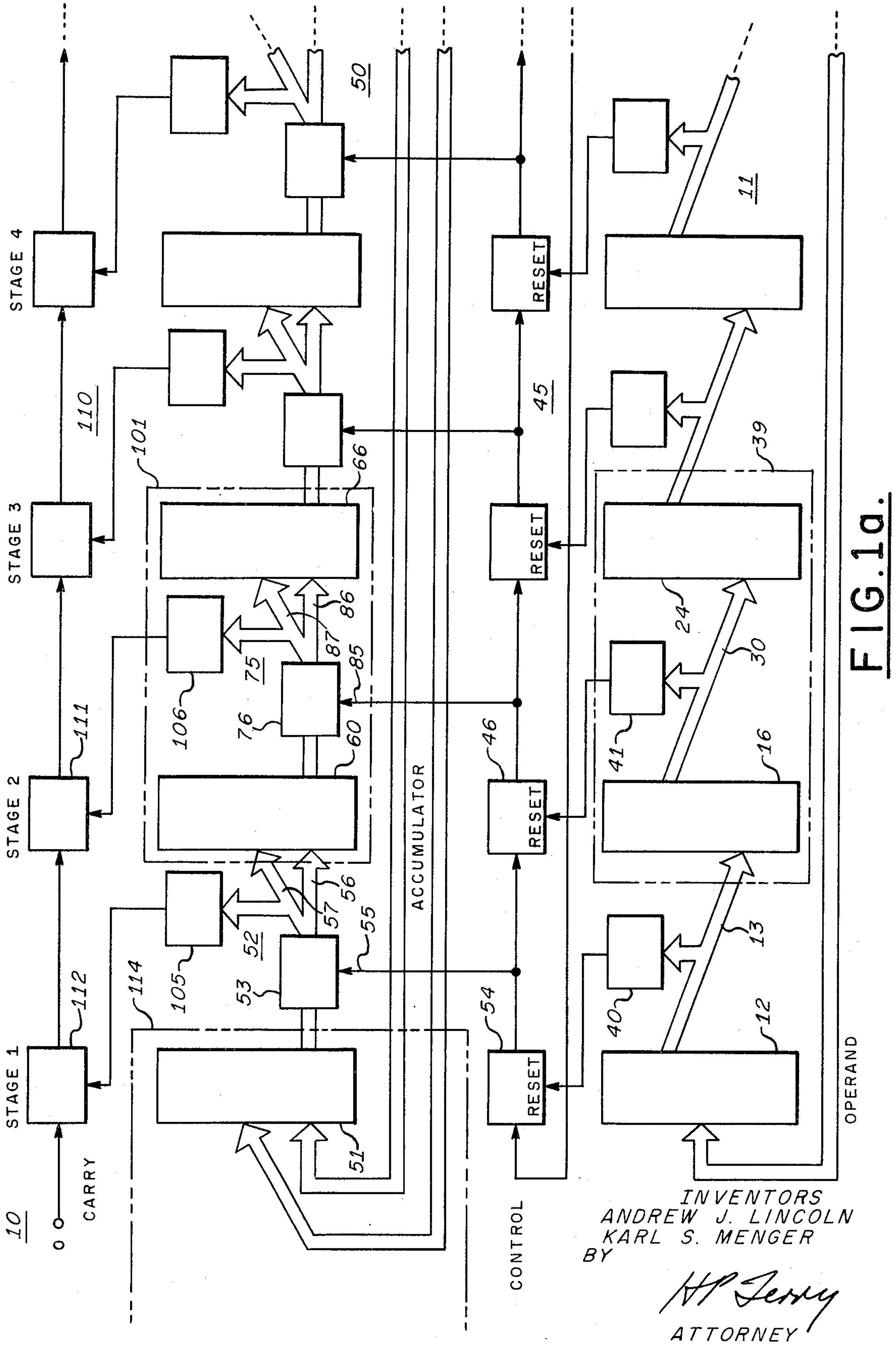
FIG. 1, which is comprised of FIGS. **1*a* and 1*b*** is a block schematic logic diagram of an arithmetic unit constructed in accordance with the present invention.

The arithmetic unit of the present invention was developed by the implementation of a novel arithmetic algorithm. The algorithm will be explained in terms of the addition operation for convenience, but it will become apparent from the description to follow that other arithmetic operations such as subtraction, multiplication and division, may be performed in accordance therewith and hence by the apparatus of the present invention.

Basically, the novel algorithm generates the sum of two numbers commonly designated as the augend and addend, respectively. The sum is generated by decreasing the addend by predetermined amounts and correspondingly increasing the augend by the same predetermined amounts until the digits of the addend attain the values of zero, respectively. When the addend attains the value zero, the augend which has been increased in accordance with the algorithm provides the desired sum. The carries generated by the augend increasing operations are appropriately added into the augend in a manner to be explained.

Conveniently, the individual digits comprising the addend may be repeatedly decreased by unity until they attain the values zero, respectively. Each of the digits of the augend is correspondingly increased by unity until the associated digit of the addend attains the value zero.

This increasing-decreasing operation may be performed simultaneously on the corresponding digit pairs of the two operands for each of the iterations of a calculation with the exception of one of the pairs of digits. The one digit pair is reserved during each iteration for adding in the carry as required. For speed of computation, the one digit pair commences with the least significant order of the two operands and proceeds sequentially through the digits toward the most significant order. The carries, which may be either zero or unity, are added into the associated augend digits as the one digit pair proceeds through the orders. When, for example, the augend digit is nine and there is a carry from the previous iteration, the augend digit becomes zero and a carry of unity is propagated to the next higher order. The addend digit associated with the carry assimilating pair of digits is maintained unaltered during the carry operation. It may be appreciated that when a digit pair is being utilized for carry assimilation, the remaining pairs of digits are simultaneously undergoing the increasing-decreasing operations previously described.

The algorithm of the present invention may be exemplified by a typical calculation where the sum 601 of an augend 354 and an addend 247 is obtained as follows:

| Iteration | | | | |
|---|---|---|---|---|
| | 0 | 0 | 0 | Carry |
| | 3 | 5 | 4 | Augend |
| 1 | 2 | 4 | 7 | Addend |
| | 0 | 0 | 0 | |
| | 4 | 6 | 4 | |
| 2 | 1 | 3 | 7 | |
| | 0 | 0 | 0 | |
| | 5 | 6 | 5 | |
| 3 | 0 | 3 | 6 | |
| | 0 | 0 | 0 | |
| | 5 | 7 | 6 | |
| 4 | 0 | 2 | 5 | |
| | 0 | 0 | 0 | |
| | 5 | 8 | 6 | |
| 5 | 0 | 1 | 5 | |
| | 0 | 0 | 0 | |
| | 5 | 8 | 7 | |
| 6 | 0 | 1 | 4 | |
| | 0 | 0 | 0 | |
| | 5 | 9 | 8 | |
| 7 | 0 | 0 | 3 | |
| | 0 | 0 | 0 | |
| | 5 | 9 | 8 | |
| 8 | 0 | 0 | 3 | |
| | 0 | 0 | 0 | |
| | 5 | 9 | 9 | |
| 9 | 0 | 0 | 2 | |
| | 0 | 1 | 0 | |
| | 5 | 9 | 0 | |
| 10 | 0 | 0 | 1 | |
| | 0 | 1 | 0 | |
| | 5 | 9 | 0 | |
| 11 | 0 | 0 | 1 | |
| | 1 | 0 | 0 | |
| | 5 | 0 | 1 | |
| 12 | 0 | 0 | 0 | |
| | 0 | 0 | 0 | |
| | 6 | 0 | 1 | |
| | 0 | 0 | 0 | |

where the rectangular boxes indicate the active digit pairs.

It may be appreciated that the algorithm in accordance with the present invention provides the proper sums of augends and addends because of the following properties:

1. The sum of the carry, augend and addend in each iteration of the algorithm procedure is always the required sum. For example, after the 10th iteration of the given calculation, the sum of these three numbers is: 010

590

001

601 where 601 is the required sum of 354+247.

2. The digits of the addend should all attain the value of zero. This result will maintain after each digit has experienced at most nine decrements of unity.

3. Each digit pair can generate at most one carry of unity since the sum of two digits including a carry cannot exceed $$9+9+1=19.$$

4. When the addend has attained the value of zero, at most one more pass through the digits is required to assimilate all of the remaining carries. It may be appreciated that this property is a consequence of property 3.

5. When the addend and carry numbers have both attained the value of zero, the augend number is the required sum. It may be appreciated that this property is a consequence of property 1.

While the algorithm has been explained in terms of addition, it may be appreciated that the difference of two numbers may be obtained by first complementing one of the operands, for example the augend, and then performing addition as described above. The procedure of subtraction by addition of complements is well known in the art.

Alternatively, the difference of two numbers may be obtained utilizing the algorithm of the present invention, by decreasing the digits of the augend instead of increasing the digits as previously described, provided that the addend magnitude does not exceed the augend magnitude.

The algorithm described above results in a preferred instrumentation of the arithmetic circuits of the present invention, when the digits of the operands are represented in accordance with the Johnson five-bit code as follows:

| Digit | Code Word<br>12345 — bit position |
|---|---|
| 0 | 00000 |
| 1 | 10000 |
| 2 | 11000 |
| 3 | 11100 |
| 4 | 11110 |
| 5 | 11111 |
| 6 | 01111 |
| 7 | 00111 |
| 8 | 00011 |
| 9 | 00001 |

The operations of increasing, decreasing and 9's complementing the digits of the operands as performed in practicing the algorithm in accordance with the present invention, are implemented utilizing the Johnson Code representation. Increasing a digit by unity is achieved by shifting the bits in bit positions 1, 2, 3 and 4 to the bit positions 2, 3, 4 and 5, respectively, and shifting the inverse of the bit in bit position 5 to the bit position 1. In a similar manner, decreasing a digit by unity is accomplished by shifting the bits in bit positions 2, 3, 4 and 5 to the bit positions 1, 2, 3 and 4, respectively, and shifting the inverse of the bit in bit position 1 to the bit position 5. It may be appreciated that the digit 9 becomes the digit zero upon increasing by unity and the digit zero becomes the digit 9 upon decreasing by unity. The 9's complement of a digit may be obtained by shifting the bits in bit positions 1, 2, 3 and 4 to the bit positions 4, 3, 2 and 1, respectively, and by shifting the inverse of the bit in bit position 5 to the bit position 5. It may further be appreciated that a digit may be transferred unaltered by shifting the bits in bit positions 1, 2, 3, 4 and 5 to the correspondingly numbered bit positions, respectively.

Figure 1B:
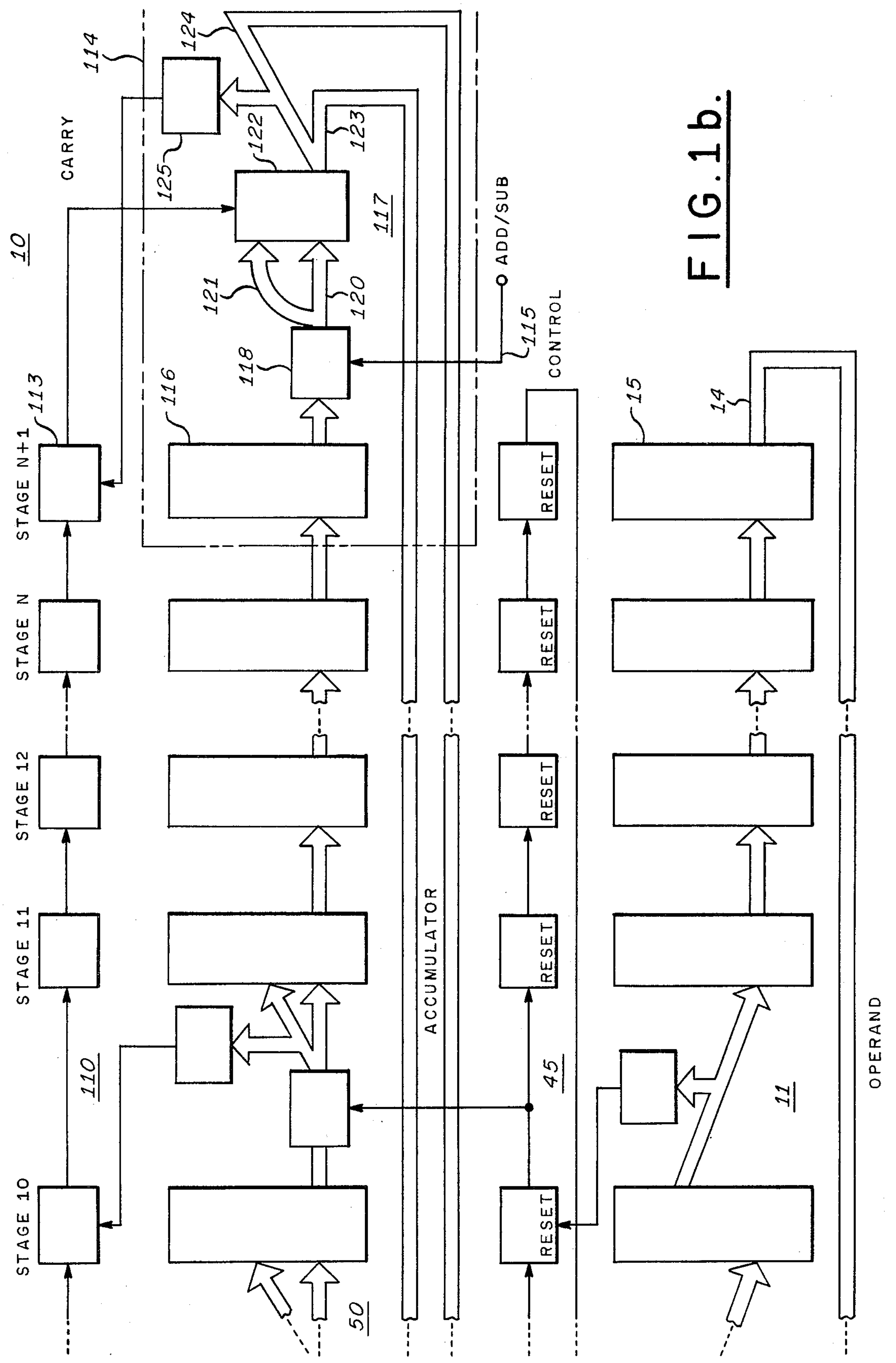

Referring now to FIG. 1, an arithmetic unit 10 instrumented in accordance with the present invention is illustrated. The arithmetic unit 10 includes an operand register 11 for storing the digits of the operand entered into the calculator via the keyboard thereof. The operand register 11 comprises a plurality of stages, a typical one of which being designated by reference numeral 12. The number of stages comprising the operand register 11 may preferably include one more than the number of digits in the operand for reasons to be explained. Each of the stages of the register 11, such as the stage 12, may include five bistable elements for storing the bits of the Johnson code representation of a digit of the operand in a manner and for reasons to be discussed. The operand register 11 is organized as a recirculating shift register where the interconnections between a group of the stages are arranged to decrease the digits of the operand as they transfer therebetween. A typical decreasing interconnection is schematically illustrated as interconnection 13. The interconnections coupling the remaining stages of the register 11 are arranged so that the digits are unmodified as they transfer therebetween. For example, an interconnection 14 that maintains the digits unaltered is disposed between a stage 15 and the stage 12 to complete the recirculating path of the operand register 11.

Figure 2:
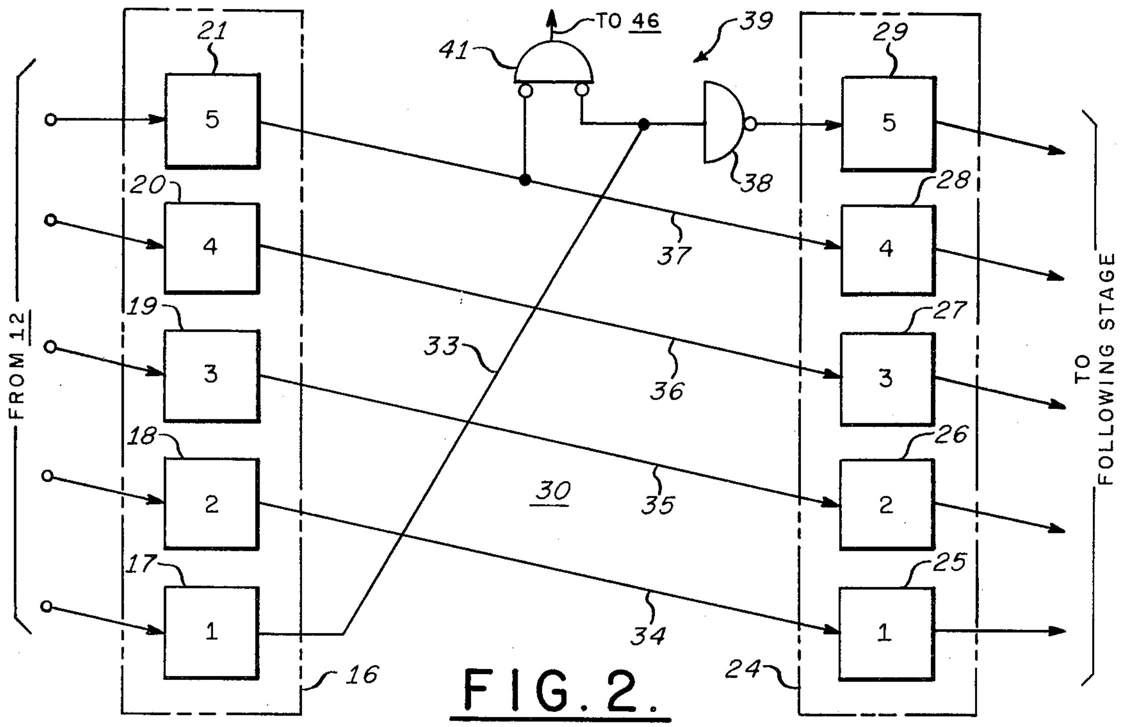
FIG. 2 is a detailed logic diagram of the portion 39 of FIG. 1.

An understanding of the decreasing interconnections typically represented by interconnection 13 may be obtained by reference to FIG. 2 where like reference numerals indicate like components with respect to FIG. 1. A stage 16 of the register 11 comprises five bistable elements 17 through 21. The bistable elements 17–21 are utilized to store the bits of bit positions 1–5, respectively, of the Johnson code representation of the digits of the operand as previously described. The legends included within the schematic representations of the bistable elements 17–21 indicate the respective bit positions of the Johnson code word. The register 11 also includes a stage 24 following the stage 16. The stage 24 is comprised of bistable elements 25 through 29 in a manner similar to that described with respect to the stage 16. The stage 16 is coupled to the stage 24 via decreasing interconnections 30. The decreasing interconnections 30 include five electrical conductors 33 through 37, the conductors 34–37 of which are connected to transfer the bits stored in the bistable elements 18–21 of the stage 16 to the bistable elements 25–28 of the stage 24, respectively. The electrical conductor 33 is coupled to transfer the inverse of the bit stored in the bistable element 17 of the stage 16, via an inverter 38, to the bistable element 29 of the stage 24. Thus it may be appreciated that as the Johnson code word representing a particular digit transfers from the stage 16 to the stage 24, the code word is transformed so as to represent the particular digit decremented by unity. It may be appreciated that the detailed illustrations of the stages 16 and 24 and the interconnections 30 of FIG. 2 comprise the portion 39 of the register 11 of FIG. 1.

It may now be understood with reference to FIG. 1 that the digits of the operand are decremented by unity as they transfer between the stages coupled by the decreasing interconnections. When a zero digit is so transferred, the digit becomes nine.

Although the number of decreasing interconnections between the stages of the register 11 compared to the number of non-altering interconnections is not unique, a preferred embodiment of the invention should include 10 decreasing interconnections, the remainder of the interconnections being of the non-altering type, for reasons to be explained.

It is understood that the non-altering interconnections comprise five electrical conductors coupling the correspondingly numbered bistable elements of adjacent stages, respectively, as previously explained with respect to the description of the Johnson code representation.

A detecting element is coupled to each of the decreasing interconnections, such as the interconnection 13, a typical one of which being indicated by reference numeral 40. The detecting element 40 provides a signal whenever the Johnson code representation of the digit zero is transferred between the stages 12 and 16. A detailed understanding of the detecting element 40 may be obtained by reference to FIG. 2 where a detecting element 41 is illustrated coupled to the interconnections 30. The detecting element 41 may comprise a logic circuit for providing the logical AND function of the inverses of the bits stored in the bistable elements 17 and 21 of the stage 16. It may be appreciated that because of the structure of the Johnson code, the element 41 uniquely provides a signal representative of the presence of the digit zero.

Referring again to FIG. 1, the arithmetic unit 10 includes a control recirculating shift register 45 comprising a plurality of stages, a typical stage being indicated by reference numeral 46. The stages of the control register 45 are in correspondence to the stages of the operand register 11, respectively. The stages of the register 45 may comprise a plurality of respective bistable devices responsive to the signals provided by the plurality of detecting elements coupled to the decreasing interconnections of the operand register 11, respectively. For example, the detecting element 41 provides a signal to the stage 46 to reset the stage to its ZERO state. In a similar manner, the remaining detecting elements are coupled to the corresponding stages of the control register 45 to reset the stages to their respective ZERO states for reasons to be explained.

It may be appreciated that only those stages of the control register 45 that are associated with the detecting elements coupled to the decreasing interconnections of the register 11 are reset in the manner described. The outputs of these stages provide a plurality of signals representative of the digits of the operand attaining the values zero, respectively, in a manner and for reasons to be explained.

It may additionally be appreciated that the stages of the control register 45 may be shifted in a synchronous manner with respect to the stages of the operand register 11 by conventional timing means not shown for clarity for reasons to be discussed.

The arithmetic unit 10 of the present invention further includes an accumulator register 50 for storing the digits of the cumulative arithmetic results of the calculator. The accumulator 50 comprises a plurality of stages corresponding to the stages of the operand register 11, respectively, a typical stage thereof being designated by reference numeral 51. Each of the stages of the accumulator 50 may include five bistable elements for storing the bits of the Johnson code representation of the digits of the cumulative result in a manner similar to that discussed with respect to the stages of the operand register 11. The number of stages comprising the accumulator 50 may preferably include one more than the number of digits of the cumulative result for reasons to be discussed.

The stages of the accumulator 50 are interconnected to form a recirculating shift register where a group of the stages are interconnected to conditionally increase the digits of the cumulative result as they transfer therebetween. A typical conditionally increasing interconnection is schematically illustrated as interconnection 52. The interconnection 52 comprises a switching circuit 53 which is coupled to the output of the stage 51. The switching circuit 53 is connected to receive a control signal from a stage 54 of the control register 45 on a lead 55. The signal on the lead 55 controls the switching circuit 53 to conditionally increase the transferring digits or to maintain the transferring digits unaltered. The switching circuit 53 is accordingly connected to a non-altering transfer path 56 of the interconnections 52 and to an increasing transfer path 57 thereof. It may be appreciated that the stages numbered 1 through 10 of the accumulator register 50 are coupled to each other by conditionally increasing interconnections such as the interconnection 52. The remaining stages of the accumulator 50, with the exception of the last stage, are interconnected by non-altering transfer paths.

Figure 3:
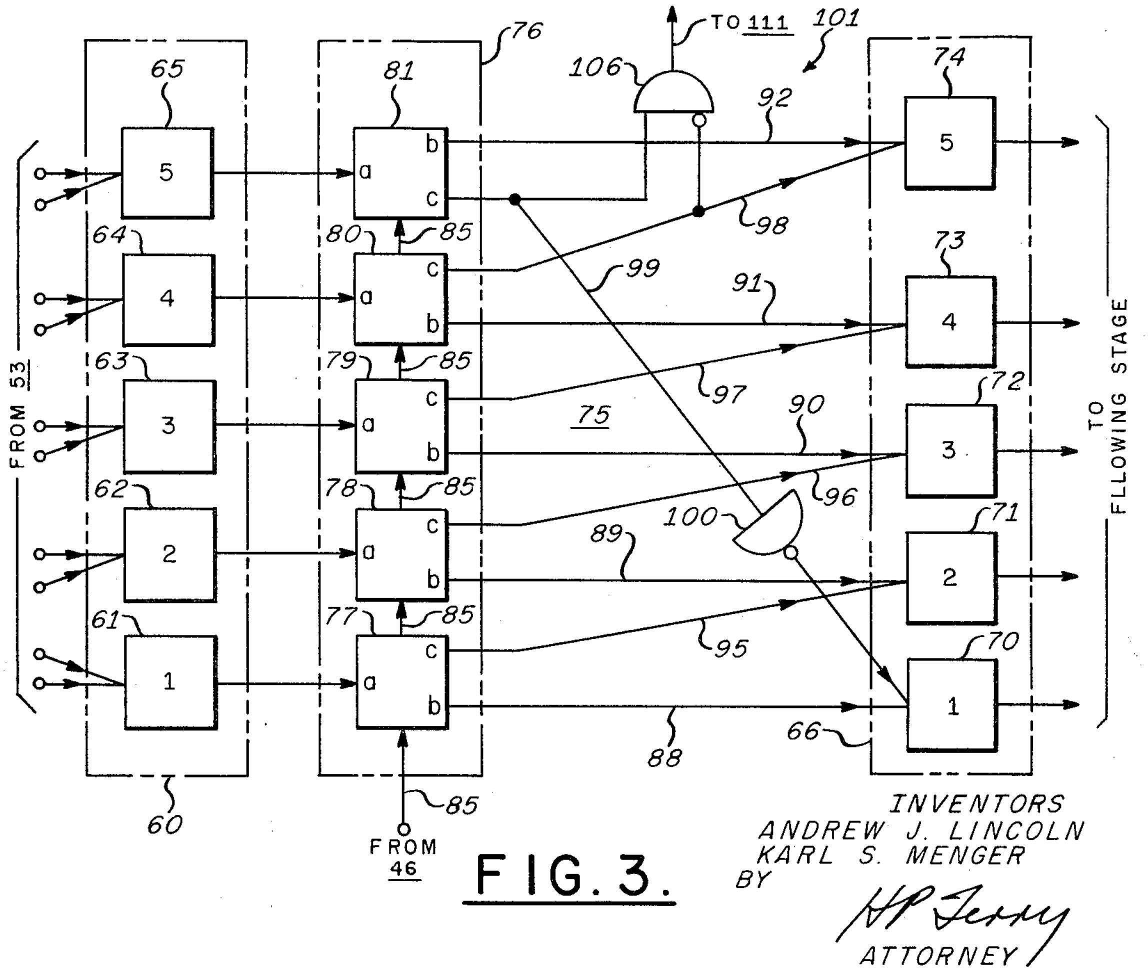
FIG. 3 is a detailed logic diagram of the portion 101 of FIG. 1.

An understanding of the conditionally increasing interconnections typically represented by the interconnection 52 may be obtained by reference to FIG. 3 where like reference numerals indicate like components with respect to FIG. 1. A stage 60 of the accumulator 50 comprises five bistable elements 61–65 which are utilized to store the bits of the Johnson code representation of the digits of the cumulative result in a manner similar to that described with respect to FIG. 2. The accumulator 50 also includes a stage 66 following the stage 60. The stage 66 is comprised of bistable elements 70–74 in a manner similar to that described with respect to the stage 60. The stage 60 is coupled to the stage 66 via conditionally increasing interconnections 75. The conditionally increasing interconnections 75 include a switching circuit 76. As previously described with respect to the switching circuit 53, the switching circuit 76 controls the conditional increasing of the digits of the cumulative result as they transfer between the stages 60 and 66.

The switching circuit 76 comprises five switches 77–81. The inputs *a* of the switches 77–81 are coupled to receive the outputs of the bistable elements 61–65, respectively. Each of the switches 77–81 is arranged to conditionally transfer the signal at input *a* to either an output *b* or an output *c* in accordance with a control signal on a lead 85. The lead 85 is connected to the output of the stage 46 of the control register 45. It may thus be appreciated that the states of the stages of the register 45 control the increasing of the digits transferring between the stages of the register 50. When the stage 46, for example, of the register 45 is in the ZERO state the inputs *a* of the switches 77–81 are connected respectively to the outputs *b* thereof. Conversely, when the stage 46 of the register 45 is in the ONE state, the switches 77–81 are controlled to transfer the inputs *a* to the outputs *c* thereof, respectively.

The interconnections 75 include a non-altering transfer path 86 (FIG. 1) and an increasing transfer path 87 (FIG. 1). The non-altering path 86 and the increasing path 87 are conditionally selected by the switching circuit 76 in accordance with the control signal on the lead 85 being in the ZERO or ONE state, respectively.

The non-altering transfer path 86 is comprised of five electrical conductors 88–92. The electrical conductors 88–92 couple the outputs *b* of the switches 77–81 to the inputs of the bistable elements 70–74 of the stage 66, respectively. It may now be appreciated that when the stage 46 of the control register 45 provides a binary ZERO signal, the bistable elements 61–65 are coupled to transfer the bits stored therein to the bistable elements 70–74, respectively. Hence the digits of the cumulative result represented by the five-bit Johnson code are transferred unaltered between the stages 60 and 66.

The increasing transfer path 87 is comprised of five conductors 95–99. The conductors 95–98 connect the outputs *c* of the switches 77-80 to the inputs of the bistable elements 71–74 respectively. The conductor 99 transfers the inverse of the signal provided by the output *c* of the switch 81, via an inverter 100, to the input of the bistable element 70. Thus it may be appreciated that when the stage 46 (FIG. 1) of the register 45 is in the ONE state the bistable elements 61–65 are connected via the switches 77–81 to the bistable elements 71, 72, 73, 74 and 70 respectively, an inverting connection being provided between the bistable element 65 and the bistable element 70 by the inverter 100. Hence, it may now be understood that when an increasing transfer path is selected by the ONE state of a stage of the register 45, a particular digit stored in the associated stage of the register 50 is transferred to the following stage thereof incremented by unity in accordance with the properties of the Johnson code previously discussed.

It should be appreciated that the detailed illustrations of the stages 60 and 66 and interconnections 75 of FIG. 3 comprise the portion 101 of the accumulator 50 of FIG. 1. It may now be appreciated with reference to FIG. 1 that the digits of the cumulative result are conditionally increased by unity as they transfer between those stages of the accumulator 50 coupled by the conditionally increasing interconnections. When a digit having a value of 9 is so transferred, the value of the digit becomes zero.

The stages of the register 50 that include conditionally increasing transfer paths correspond to those stages of the operand register 11 that include decreasing transfer paths. The remaining stages of the accumulator 50, with the exception of the last stage N + 1, corresponding to the stages of the operand register 11 that include non-altering transfer paths, also include non-altering transfer paths of the type previously discussed with respect to the register 11.

It may be appreciated that when a digit having a value of 9 transfers between two adjacent stages of the accumulator 50 along an increasing path to become the digit zero, a carry must be generated and propagated to the next higher order. Accordingly, a carry detecting element is coupled to each of the increasing transfer paths, such as the path 57, a typical element being indicated by reference numeral 105. The carry detecting element 105 provides a signal whenever the Johnson code representation of the digit 9 is transferred between the stages 51 and 60 along the increasing path 57.

A detailed understanding of the carry detecting element 105 may be obtained by reference to FIG. 3 where a carry detecting element 106 is illustrated coupled to the increasing transfer path 87. In particular, the carry detecting element 106 is coupled to the conductors 98 and 99 of the increasing transfer path 87. The carry detecting element 106 may comprise a logic circuit for providing the logical AND function of the bit provided by the output *c* of the switch 81 and the inverse of the bit provided by the output *c* of the switch 80 hence providing the logical AND function of bit position 5 with the inverse of bit position 4 when the increasing path is selected by the control signal on the lead 85. It may be appreciated that because of the structure of the Johnson code, the carry detecting element 106 uniquely provides a signal representative of the transfer of the digit 9 via the increasing path 87, hence providing a signal representative of a carry as required.

Referring again to FIG. 1, the arithmetic unit 10 includes a carry shift register 110 comprising a plurality of stages, a typical stage being indicated by reference numeral 111. The stages of the carry register 110 are in correspondence with the stages of the accumulator register 50, respectively. A binary ZERO signal is applied as the input to a stage 112, for reasons to be explained.

The stages of the carry register 110 may comprise a plurality of respective bistable devices responsive to the signals provided by the plurality of carry detecting elements coupled to the increasing interconnections of the accumulator 50, respectively. For example, the detecting element 106 provides a signal to the stage 111 to set the stage to its ONE state. In a similar manner, the remaining detecting elements are coupled to the corresponding stages of the carry register 110 to set the stages to their respective ONE states for reasons to be explained.

It may be appreciated that only those stages of the carry register 110 that are associated with the carry detecting elements are set in the manner described. The register 110 stores the carries generated during an arithmetic operation which are sequentially provided via a stage 113 to the accumulator 50 in a manner and for reasons to be explained.

The carries provided by the carry register 110 via the stage 113 are applied to a section 114 of the accumulator register 50. The section 114 combines the carries with the digits of the cumulative result as the digits are shifted therethrough. The section 114 further provides the digits of the cumulative result selectively unaltered or in complement form in accordance with an ADD/SUB signal on a lead 115. Thus the section 114 determines whether the arithmetic unit 10 performs addition or subtraction in accordance with the ADD/SUB signal in a manner to be described.

The section 114 comprises an accumulator stage 116 as well as the adjacent following stage 51 previously discussed. The stages 51 and 116 each comprise five bistable elements similarly to that previously described with respect to the stage 60. The stage 116 is coupled to the stage 51 via interconnections 117 which provide the recirculating path for the accumulator register 50. The interconnections 117 include a switching circuit 118 to which the outputs of the stage 116 are applied, the outputs of the switching circuit 118 being applied, in turn, to a non-altering transfer path 120 and a complementing transfer path 121. The switching circuit 118 selects between the non-altering transfer path 120 and complementing transfer path 121 in accordance with the ADD/SUB signal on the lead 115. The non-altering path 120 is selected when the ADD/SUB signal is representative of addition and the complementing path 121 is selected when the ADD/SUB signal is representative of subtraction.

The digit signals transferring along the transfer paths 120 and 121 are applied to a switching circuit 122 which is additionally responsive to the carry outputs of the stage 113 of the carry register 110. The outputs of the switching circuit 122 are in turn applied to a non-altering transfer path 123 and an increasing transfer path 124. The switching circuit 122 selects between the non-altering path 123 and the increasing path 124 in accordance with the carry signal from the stage 113 of the carry register 110 being ZERO or ONE respectively. It may thus be appreciated that when a signal representative of a carry is applied to the switching circuit 122 from the stage 113, a digit transferring from the stage 116 to the stage 51 is incremented by unity by reason of the selection of the increasing path 124. When the signal is representative of no carry, the digits are transferred unaltered along the path 123 as required.

As previously discussed, the assimilation of a carry by means of the section 114 of the accumulator 50 may generate a further carry to be absorbed. Accordingly, a carry detecting element 125 is connected to the increasing path 124 and functions in a manner similar to that described with respect to the detecting element 106. The element 125 provides a signal to the stage 113 of the carry register 110 to set the stage to the ONE state for reasons similar to that described with respect to the detecting element 106 and the stage 111.

Figure 4:
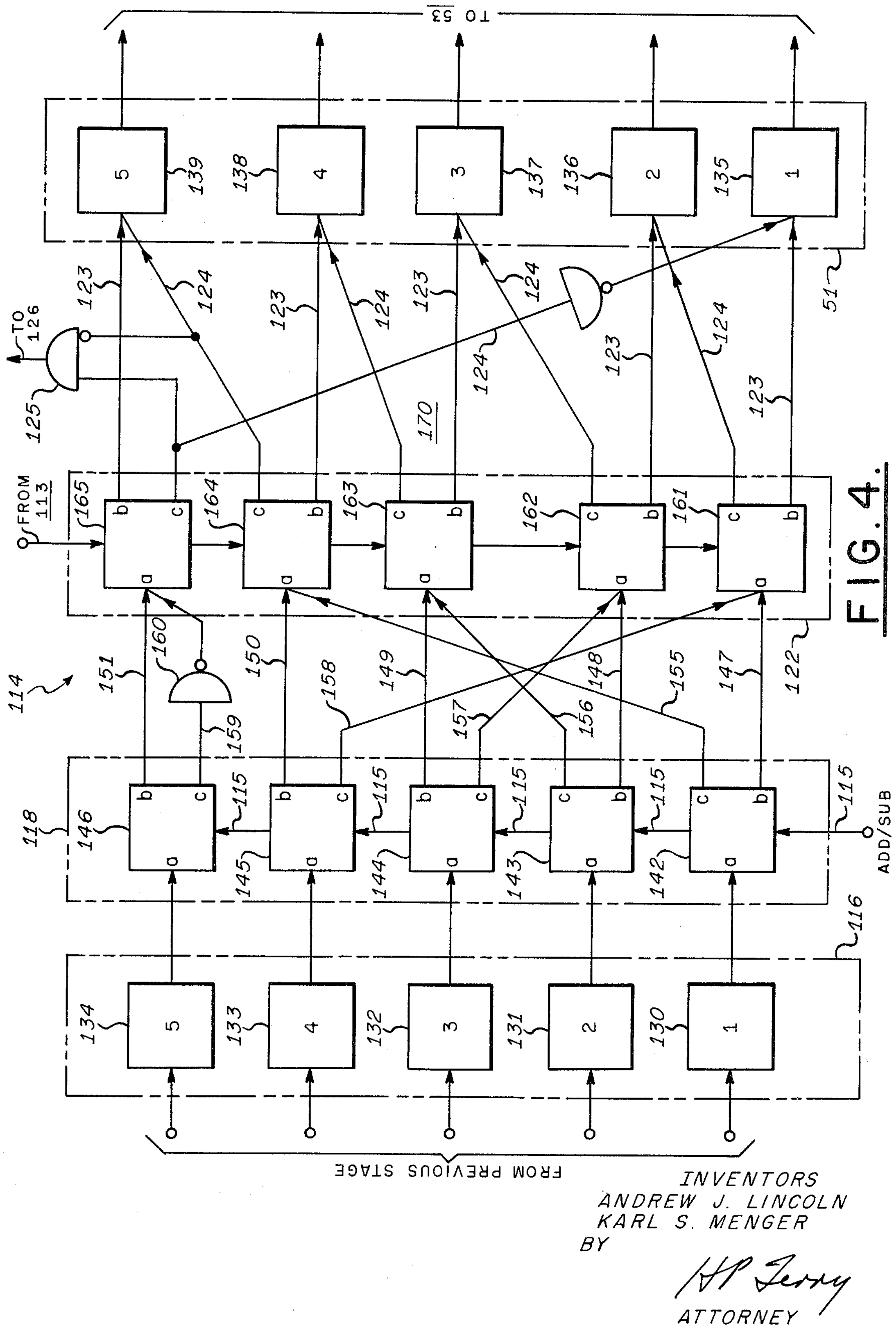
FIG. 4 is a detailed logic diagram of the portion 114 of FIG. 1.

A detailed appreciation of the circuits of the section 114 of the accumulator 50 may be had by reference to FIG. 4 where like reference numerals indicate like components with respect to FIG. 1. The stage 116 comprises five bistable elements 130–134 and the adjacent following stage 51 comprises five bistable elements 135–139 in a manner similar to that described with respect to the stage 60 of FIG. 3. The switching circuit 118 comprises five switches 142–146 each having an *a* input and *b* and *c* outputs similarly to that described with respect to the switches 77–81 of FIG. 3. When the ADD/SUB signal on the lead 115 is representative of addition, the switches 142–146 are actuated to connect the inputs "a" to the outputs *b* , respectively. Similarly when the ADD/SUB signal is representative of subtraction, the switches 142–146 are actuated to connect the inputs *a* to the outputs *c*, respectively. The inputs "a" of the switches 142–146 are coupled to receive the bits stored in the bistable elements 130–134, respectively, and the outputs *b* thereof are coupled to the non-altering transfer path 120 (FIG. 1).

The non-altering transfer path 120 is comprised of five electrical conductors 147–151 which are connected respectively to the *b* outputs of the switches 142–146. The *c* outputs of the switches 142–146 are connected to the complementing transfer path 121 (FIG. 1) which comprises electrical conductors 155–159. The electrical conductors 155–159 are connected, respectively, to the *c* outputs of the switches 142–146, the conductor 159 transmitting the inverse of the bit from the *c* output of the switch 146 via an inverter 160.

The switching circuit 122 comprises five switches 161–165 of a type similar to that discussed with respect to the switches 142–146. The electrical conductors 151 and the output of the inverter 160 are applied in OR configuration to the *a* input of the switch 165. In a similar manner, the conductor pairs 147 and 158, 148 and 157, 149 and 156, 150 and 155, are connected to the *a* inputs of the switches 161–164, respectively. It may therefore now be appreciated that when the ADD/SUB signal on the lead 115 is representative of addition, the digits of the cumulative result in the accumulator register 50 transfer unaltered from the stage 116 to the switching circuit 122 whereas when the ADD/SUB signal is representative of subtraction, the 9's complements of the digits are transferred therebetween.

The outputs of the switching circuit 122 are coupled to the inputs of the stage 51 by means of a conditionally increasing transfer interconnection 170. It may be appreciated that the interconnection 170 is comprised of the non-altering transfer path 123 and the increasing transfer path 124. The structure and operation of the interconnections 170 are identical to that previously described with respect to the interconnections 75 of FIG. 3, with the exception of the actuating signal to the switching circuit 122, and will not be repeated here for brevity. The actuating signal to the switching circuit 122 is provided by the carry signals from the stage 113 of the register 110 rather than from the stages of the control register 45 as previously explained with respect to the interconnections 75.

The detecting element 125 is coupled to the interconnections 170 and provides carry signals in the manner previously described with respect to the element 106 of FIG. 3.

It is now understood that when a signal representative of a carry is applied to the switching circuit 122 from the stage 113 of the carry register 110, the digits of the cumulative result transferring between the switching circuit 122 and the stage 51 are incremented by unity and when the signal from the stage 113 is representative of no carry, the digits are transferred unaltered therebetween as required.

It is now appreciated that the digits of the cumulative result may transfer between the stages 116 and 51 of the accumulator 50 in accordance with one of four selected modes: The digits may transfer unaltered; the digits may be incremented by unity; the 9's complements of the digits may be transferred; or the digits may be both complemented and incremented. It may be appreciated by those skilled in the art that although the complementing and incrementing functions are serially implemented with respect to each other in the preferred embodiment of the invention, an alternative logic circuit of conventional design may be utilized for selecting the four conditions in accordance with the two binary signals appearing on the lead 115 and provided by the stage 113, respectively, to the same effect.

It may be appreciated that the stages numbered one through ten of the registers 11, 45, 50 and 110, respectively, perform the digit arithmetic manipulations hereinabove described and that the stages numbered 11 through N transfer the digits unaltered therebetween in conventional shift register fashion. The stage N + 1 of the accumulator register 50 performs the complementing and carry assimilating functions previously described.

The operation of the arithmetic unit 10 will first be described with respect to addition. The arithmetic unit 10 is conditioned to perform addition by entering an operand into the operand register 11 by means of, for example, an associated keyboard, the least significant digit being entered into the stage N thereof. The remainder of the digits of the operand are entered into the stages numbered one through N −1, respectively, where the contents of unused stages are set to zero. A cumulative result is assumed to be in the accumulator register 50 with the least significant digit thereof being in the stage N and the remainder of the digits being in the stages one through N −1, respectively, where the contents of unused stages are again set to zero. The digits of the orders of both the operand and the cumulative result are aligned with respect to each other in the stages of the registers 11 and 50, respectively. The sign of the cumulative result may be assumed positive for convenience.

The ADD operation key is then depressed which sets the ADD/SUB signal on the lead 115 to the state representative of the addition operation. The non-altering path 120 of the accumulator register 50 is thus selected by the switching circuit 118 as previously described. Initially, preceding the addition operation, all of the stages of the control register 45 are set to the ONE state, which selects the associated increasing paths of the accumulator 50.

Addition in the unit 10 occurs under control of a clock, not shown. The preferred embodiment of the invention utilizes what is known in the art as a two-phase clock. During the first clock phase, signals are entered into every one of the N +1 stages of each of the four registers depicted in FIG. 1. During the second phase, the entered signals are issued respectively as output signals by these same stages. First phase activity then recurs, followed by second phase activity again, and so on— this alternating sequence of first and second phase activities continuing until the machine computation is completed.

Under control of this two-phase clocking, the digits circulate in the operand register 11 as follows. Output digit signals issued at the conclusion of a second phase activity by the first stage 12, second stage 16, third stage 24, up to and including the 10th stage of the operand register 11 are each diminished by unity and entered during the next first phase to second stage 16, third stage 24, fourth stage, up to and including the 11th stage in the operand register, respectively. The unity decrementing during transfer of a 0-digit results in a 9-digit. Digit signals issued by the remaining eleventh stage, 12th stage, up to and including the $N + 1^{st}$ stage 15 of the operand register upon conclusion of a second phase activity are entered unmodified into the 12th stage, 13th stage, etc., respectively, during the next first phase activity. In particular, the digit signal issued by the $N + 1^{st}$ stage 15 in the operand register 11, is entered into the first stage 12 in that same register.

Operand register 11 influences control register 45 as follows. If, upon conclusion of a second phase activity, a stage in the operand register 11 (for example, stage 16) issues a Johnson coded digit signal identified with the zero digit, then during the next first phase activity, the associated detection circuit (circuit 41 for this example ) will cause a ZERO signal to be entered into the associated stage of the control register 45 (stage 46 in this example). On the other hand, if upon the completion of a second phase activity, a stage in the operand register 11 (for example stage 16 again) issues any digit signal that is not the ZERO signal, then, during the next first phase activity, the associated detection circuit (circuit 41 for this example) will allow the associated stage in the control register 45 (stage 46 for this example) to receive as entered input the output of the preceding stage in the control register 45 (stage 54 in this example) issued by that stage immediately prior to the present activity.

The influence of the control register 45 upon the accumulator 50 under this two-phase clocking system is illustrated in the following example. When, upon completion of a second phase activity, the stage 46 of control register 45 issues a ZERO output signal, then switching circuit 76 selects the non-altering path 86, causing, upon completion of the next first phase activity, stage 66 in accumulator 50 to receive, as entered input, the output digit signal issued by preceding stage 60 immediately prior to the present activity. On the other hand, when, upon completion of a second phase activity, the stage 46 of control register 45 issues a ONE output signal, then switching circuit 76 selects the increasing path 87, causing, upon completion of the following first phase activity, stage 66 in accumulator 50 to receive, as entered input, the output digit issued by preceding stage 60 (immediately prior to the present activity) but incremented by unity. Here, unit incrementing of a digit 9 results in a digit 0.

Furthermore, a digit stored in the stage 116 of accumulator 50 at the conclusion of a second phase activity will enter stage 51 during the next first phase. Switching circuit 118 actuated by the signal on ADD/SUB line 115 determines whether or not the transferred digit passes unaltered via path 120 (it does so for addition, but not for subtraction), and thence through either increasing path 124 or non-altering path 123 determined by switching circuit 122 actuated by the signal issued by stage 113 of the carry register 110, for reasons to be explained.

As the digits of the cumulative result transfer between the stages of the accumulator 50, those digits having the value 9 that are increased to the value zero when incremented by unity during transfer as previously discussed, cause the detecting elements associated therewith to set the associated stages of the carry register 110 to the ONE state hence storing the generated carries. For example, whenever stage 60 issues a digit 9 signal following completion of a second phase activity, and concurrently, the stage 46 in control register 45 issues a ONE signal, then detecting element 106 causes a ONE signal to enter stage 111 of carry register 110 during the next first phase activity. On the other hand, if stage 60 issues a signal that represents a digit other than 9, or if stage 46 issues a ZERO signal, then during the next first phase activity, detection element 106 allows stage 111 to receive as entered input, the unaltered output of stage 112 issued immediately prior to this first phase activity.

Shifting the carry register 110 by one position during each full clock period, maintains the carries properly associated with the orders of the number in the accumulator 50 with which they are to be combined, respectively. When a digit of the cumulative result is shifted into the accumulator stage 116, the associated carry is shifted into the stage 113 of the carry register 110. A carry (that is, a ONE signal) issued by stage 113 at the conclusion of a second phase acitivity will actuate the switching circuit 122 in accumulator 50 and cause the digit to pass through increasing path 124 before it enters stage 51. If that digit was a 9, so that it will be incremented to a zero with a carry, then a ONE signal is entered into stage 113 during the next first phase. It will be appreciated that the accumulator stage 116 influences the carry register stage 113 just as accumulator stage 60 influences carry register stage 111 in the above example; however, here switching element 122 in accumulator 50 is actuated by the carry register stage 113 whereas switching element 76 in the earlier example is actuated by stage 46 in control register 45. As the stages of the carry register 110 are shifted, a binary ZERO signal representative of no carry is shifted into the stage 112 of the register 110 as required.

It may now be appreciated that after the operand experiences a complete circulation through the recirculating operand register 11, the digits thereof will each have undergone ten decrements of unity therefore restoring the digits to their original values. This result is achieved because of the ten decreasing interconnections of the operand register 11. Since each digit of the operand has been decremented through zero, all of the stages of the control register 45 are reset to their ZERO states after the complete circulation.

During this circulation of the operand, the digits of the cumulative result are simultaneously circulated through the accumulator 50 thus being increased in accordance with the arithmetic algorithm previously described. During the circulation of the cumulative result, some of the carries generated by increasing the digits thereof are combined therewith in the section 114 of the accumulator 50 as previously explained. It may be appreciated that residual carries may remain in the carry register after the first recirculation of the digits. A second circulation of the digits is required to assimilate the residual carries. Thus, it may be appreciated that an addition operation may require two complete circulations of the digits of the numbers to be combined, the sum of the two numbers replacing the previous cumulative result in the accumulator 50 to become the current cumulative result.

Since the digits of the operand have undergone 20 decrements of unity in the arithmetic procedure of addition, the number remaining in the operand register 11 after the addition procedure has been completed is the operand originally entered thereinto. This is a desirable feature of the arithmetic unit 10 of the present invention since it permits the operator of the calculator to perform repeated additions of an operand without necessitating re-entry thereof before each addition.

The circulation of the registers of the arithmetic unit 10 may conveniently be controlled by entering the code word 10101 into the stages 15 and 116 of the registers 11 and 50, respectively, before the addition operation is initiated. It will be appreciated that the word 10101 is distinct from the Johnson code words for the ten digits; thus this word serves to identify the location of the least significant digit at any moment which follows the marker word as the N + 1 words circulate in the accumulator 50 and operand register 11, respectively. It may also be appreciated that this marker pattern is never transferred into any of the Johnson code words for the decimal digits as the marker is transferred through the various paths of the registers. The recirculations of the registers may thus be controlled by detecting the marker words by conventional means not shown as they transfer through the stages 15 and 116. The marker detection equipment may be utilized to stop the arithmetic operation after it has been concluded.

The arithmetic unit 10 may be controlled by means of the ADD/SUB signal on the lead 115 to perform subtraction as well as addition. When the ADD/SUB signal is representative of the subtraction operation, the switching circuit 118 is actuated to select the complementing path 121. Initially, in a subtraction operation, the operand is entered into the operand register 11 in a manner similar to that described with respect to the addition operation and the accumulator register 50 similarly stores the current cumulative result. In subtraction, however, the stages of the control register are initially reset to their ZERO states, respectively, and the stage 113 of the carry register 110 is initially set to its ONE state. Under the given conditions, a complete recirculation of the accumulator 50 sequentially transforms the digits of the cumulative result to their respective complements as the digits transfer through the interconnections 117. Since the complementing interconnection 121 provides the 9's complements of the digits, as previously explained, and the stage 113, preset to its ONE state, increments the complemented least significant digit of the cumulative result by unity, the 10's complement of the number stored in the accumulator register 50 is obtained in accordance with the well known arithmetic rules associated therewith.

Thus, it may be appreciated that the first circulation of a subtraction operation is utilized to complement the cumulative result. The ADD/SUB signal on the lead 115 is then set to addition and the next two following recirculations of the digits performs addition as previously described. Thus, the subtraction operation is accomplished by the well known method of addition of a complement.

A fourth circulation of the accumulator 50 may be required to recomplement the result thus providing the arithmetic answer as a standard decimal number as required in the desk calculator art.

It may be appreciated that the arithmetic unit 10 of the present invention may alternatively be utilized to perform subtraction by replacing all of the increasing interconnections of the accumulator register 50 by decreasing interconnections. Subtraction will then be performed in identically the same manner as the addition operation previously described, provided that the minuend exceeds the subtrahend.

It may further be appreciated that the cumulative result of a series of additions and subtractions may become negative. A bistable device, not shown, may be utilized to store the sign of the current cumulative result. A negative cumulative result may be detected by an overflow of the accumulator register 50. An overflow occurs when the stage 113 of the carry register 110 is in the ONE state after the conclusion of a complete circulation of the digits of the cumulative result. Since the cumulative result may be negative when performing an addition operation, the sign stored in the bistable device, not shown, and the signals from the stage 113 of the carry register 110 may be utilized to appropriately control the ADD/SUB signal on the lead 115 and the insertion of the ONE into the stage 113 as previously described.

It may now be appreciated that the arithmetic unit 10 of the present invention may be utilized to perform other arithmetic operations such as multiplication and division. This may be accomplished by apparatus not shown for controlling the unit 10 to perform repeated addition in accordance with a conventional multiplication algorithm and repeated subtraction in accordance with a conventional division algorithm.

It may be appreciated that, by the inclusion of circuits not shown, increasing and decreasing of the digits by amounts greater than unity may be accomplished for enhanced speed of operation.

It may further be appreciated that the components of the present invention are schematically illustrated and may be implemented, by those skilled in the art, by a variety of known circuit elements. For example, a system of static logic implemented with conventional flip-flops may be utilized in accordance with the two-phase clock system hereinabove described. Alternatively, the present invention may be implemented by a system of two-phase dynamic logic where each bistable element of each stage is comprised of two serially connected gating elements sequentially actuated by the staggered two-phase clock.

It may further be appreciated that although the carry detecting elements are shown connected to the outputs of the interstage switching circuits of the accumulator 50, the elements may alternatively be connected to the outputs of the associated accumulator stages with additional inputs coupled to receive the associated control signals thus enabling the elements when the control signals select the increasing transfer paths respectively. This arrangement may be desirable when instrumenting the invention in accordance with the two-phase dynamic logic previously discussed.

It may further be appreciated that the binary bit inversions required in increasing, decreasing and complementing the Johnson code representations of the digits of the operands may be instrumented, when utilizing elements providing true and complemented outputs, by connecting the complemented output to the inputs of the associated next following elements where appropriate. Thus, the inverters illustrated in the preferred embodiment of the invention would not be required.

It may be understood that the Johnson coded digits stored in the stages of the registers 11 and 50 may readily be displayed by conventional segmented numeric indicators by means of connections to the appropriate bistable elements of the stages in accordance with the logic of the Johnson code.

It may now be appreciated that the present invention is particularly suitable, in accordance with the LSI discipline, for instrumentation on a single semiconductor chip. An operand register and an accumulator register are conventionally required to instrument desk calculator arithmetic circuits as previously discussed. The arithmetic unit additionally required in conventional circuits, as described above, is not necessary in the present invention because of the arithmetic shifting interconnections between the stages of the registers. Since primarily shift register interconnections are utilized to instrument the present invention, the resulting circuit has a relatively low complexity, as previously described, hence minimizing the chip area required to fabricate the device. In addition, the repeated logic pattern used in instrumenting the registers of the invention facilitates LSI fabrication for reasons understood in the art.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. Apparatus for arithmetically combining the value of a first number with the value of a second number comprising
   means for diminishing the values of the digits of said first number by a predetermined amount, respectively, until each said digit attains the value zero, and
   means for altering the values of those digits of said second number corresponding to those digits of said first number not having attained the value zero, said digits of said second number being altered by said predetermined amount respectively.

2. The apparatus of claim 1 in which said altering means comprises means for increasing the values of those digits of said second number corresponding to those digits of said first number not having attained the value zero, said digits of said second number being increased by said predetermined amount.

3. The apparatus of claim 2 in which said increasing means further includes means for incrementing said digits of said second number in accordance with carries resulting from said increasing said digits.

4. The apparatus of claim 3 in which
said incrementing means comprises means for operating sequentially upon said digits of said second number, and
said increasing means comprises means for concurrently operating upon the remaining of said digits of said second number.

5. The apparatus of claim 4 in which said predetermined amount is unity.

6. The apparatus of claim 4 further including control means responsive to said diminishing means for providing a plurality of control signals representative respectively of the digits of said first number attaining the value zero, said control signals being applied to said increasing means to control the operations thereof.

7. The apparatus of claim 6 in which said diminishing means comprises
first shift register means having stages for storing said digits of said first number respectively, and
first interconnecting means coupled between said stages for diminishing the values of said digits by said predetermined amounts, respectively, as said digits transfer therebetween.

8. The apparatus of claim 7 in which said control means comprises
first detecting means coupled to said first interconnecting means for detecting zero valued digits stored in said stages respectively, and
control shift register means having stages coupled to store the signals from said first detecting means to provide said plurality of control signals, respectively.

9. The apparatus of claim 8 in which each said stage of said first register means comprises five bistable elements corresponding respectively to the five bit positions of the Johnson code representation of said digits of said first number for storing the bits thereof respectively.

10. The apparatus of claim 9 in which said first interconnecting means comprises first, second, third, fourth and fifth electrical conductor means coupling the bistable elements of each said stage corresponding to said bit positions 1, 2, 3, 4 and 5, respectively, to the bistable elements of the next following stage corresponding to said bit positions 5, 1, 2, 3 and 4, respectively, for transferring the bits stored in said bistable elements of said stage to said bistable elements of said next following stage coupled thereto, respectively,
said first electrical conductor means being coupled for transferring the inverse of the bit stored in said bistable element of said stage corresponding to said bit position 1 to said bistable element of said next following stage corresponding to said bit position 5.

11. The apparatus of claim 10 in which said first detecting means comprises AND gate means coupled to said first and fifth conductor means to detect zero valued bits stored in the corresponding bistable elements of said stages, respectively.

12. The apparatus of claim 8 in which said increasing means comprises
second shift register means having stages for storing said digits of said second number respectively, and
second interconnecting means coupled between said stages and responsive to said plurality of control signals, respectively, for selectively either increasing by said predetermined amounts or maintaining unaltered the values of said digits of said second number as said digits transfer between said stages,
said digits of said second number being increased in response to those of said control signals corresponding to said digits of said first number not having attained the value zero and being maintained unaltered in response to those of said control signals corresponding to said digits of said first number having attained the value zero.

13. The apparatus of claim 12 in which said incrementing means comprises
second detecting means coupled to said second interconnecting means for detecting carries resulting from said increasing said digits of said second number respectively,
carry shift register means having stages coupled to store the carry signals from said second detecting means respectively,
an additional stage included in said second register means, and
additional interconnecting means included in said second interconnecting means and coupled between said additional stage and the following stage of said second register means and responsive to the carry signals from said carry register means for selectively either increasing by unity or maintaining unaltered the values of said digits of said second number in accordance with said corresponding carry signals representing unity or zero, respectively, as said digits sequentially transfer between said additional stage and said following stage.

14. The apparatus of claim 13 in which
said first register means includes an additional stage corresponding to said additional stage of said second register means, and
said first interconnecting means includes additional interconnecting means coupled between said additional stage of said first register means and the following stage thereof for transferring said digits of said first number unaltered therebetween.

15. The apparatus of claim 14 in which said predetermined amounts are unity.

16. The apparatus of claim 14 in which said first, second and control shift register means comprise recirculating shift register means, respectively.

17. The apparatus of claim 13 in which each said stage of said second register means comprises five bistable elements corresponding respectively to the five bit positions of the Johnson Code representation of said digits of said second number for storing the bits thereof respectively.

18. The apparatus of claim 17 in which said second interconnecting means comprises first, second, third, fourth and fifth switching means responsive to said plurality of control signals and selectively coupling the bistable elements of each said stage corresponding to said bit positions 1, 2, 3, 4 and 5 to the correspondingly numbered bistable elements of the next following stage, respectively, or to the bistable elements of said next following stage corresponding to said bit position 2, 3, 4, 5 and 1, respectively, for transferring the bits stored in said bistable elements of said stage to said bistable elements of said next following stage selectively coupled thereto, respectively,
said correspondingly numbered bistable elements being selected in response to those of said control signals corresponding to said digits of said first number having attained the value zero and said bistable elements corresponding to said bit positions 2, 3, 4, 5 and 1 being selected in response to those of said control signals corresponding to said digits of said first number not having attained the value zero,
said fifth switching means being arranged for transferring the inverse of the bit stored in said bistable element of said stage corresponding to said bit position 5 to said bistable element of said next following stage corresponding to said bit position 1.

19. The apparatus of claim 18 in which said second detecting means comprises AND gate means responsive to said bistable elements of said stages of said second register means for providing said carry signals whenever said bits representative of the digit 9 are transferred from said bistable elements corresponding to said bit positions 1, 2, 3, 4 and 5 to said bistable elements corresponding to said bit positions 2, 3, 4, 5 and 1, respectively.

20. The apparatus of claim 18 for arithmetically combining said value of said first number with said value of said second number to selectively provide the sum or difference thereof in accordance with an ADD/SUB signal further including
means included in said increasing means for selectively complementing or maintaining unaltered the digits of said second number in accordance with said ADD/SUB signal thereby selectively providing said difference or sum, respectively.

21. The apparatus of claim 20 in which said complementing means comprises a further stage included in said second register means, and further interconnecting means included in said second interconnecting means and coupled between said further stage and the next following stage and responsive to said ADD/SUB signal for selectively complementing or maintaining unaltered the digits of said second number in accordance with said ADD/SUB signal representing subtraction or addition, respectively, as said digits sequentially transfer between said further stage and said following stage.

22. The apparatus of claim 21 in which said further stage comprises five bistable elements corresponding respectively to the five bit positions of the Johnson code representation of said digits of said second number for storing the bits thereof respectively.

23. The apparatus of claim 22 in which said further interconnecting means comprises sixth, seventh, eighth, ninth and tenth switching means responsive to said ADD/SUB signal and selectively coupling the bistable elements of said further stage corresponding to said bit positions 1, 2, 3, 4 and 5 to the correspondingly numbered bistable elements of said next following stage, respectively, or to the bistable elements of said next following stage corresponding to said bit positions 4, 3, 2, 1 and 5, respectively, for transferring the bits stored in said bistable elements of said further stage to said bistable elements of said next following stage selectively coupled thereto, respectively, said correspondingly numbered bistable elements being selected in response to said ADD/SUB signal being representative of addition and said bistable elements corresponding to said bit positions 4, 3, 2, 1 and 5 being selected in response to said ADD/SUB signal being representative of subtraction, said tenth switching means being arranged for transferring the inverse of the bit stored in said bistable element of said further stage corresponding to said bit position 5 to said bistable element of said next following stage corresponding to said bit position 5 when said ADD/SUB signal is representative of subtraction.

24. Apparatus for altering the value of a digit represented in the Johnson code from one value to another value, comprising first means for storing the bits of the bit positions of said Johnson code representation of said digit respectively, second means for storing the bits of said bit positions of said Johnson code representation of the altered digit respectively, and means coupling said first means to said second means for transferring said bits stored in said first means to said second means, the stored bit corresponding to at least one particular bit position in said first means being transferred to a bit position in said second means different from said particular bit position.

25. The apparatus of claim 24 in which said first means comprises five bistable elements corresponding respectively to the five bit positions of said Johnson code representation of said digit for storing the bits thereof respectively, said second means comprises five bistable elements corresponding respectively to the five bit positions of said Johnson code representation of said altered digit for storing the bits thereof respectively, and said coupling means comprises first, second, third, fourth and fifth electrical conductor means coupling said bistable elements of said first means to said bistable elements of said second means, respectively, at least one of said conductor means coupling a bistable element of said first means corresponding to a particular bit position to a bistable element of said second means corresponding to a bit position different from said particular bit position.

26. The apparatus of claim 25 for decreasing the value of said digit in which said first, second, third, fourth and fifth conductor means couple said bistable elements of said first means corresponding to said bit positions 1, 2, 3, 4 and 5 to said bistable elements of said second means corresponding to said bit positions 5, 1, 2, 3 and 4, respectively, said first conductor means transferring the bit stored at said bit position 1 of said first means to said bit position 5 of said second means inverted.

27. The apparatus of claim 25 for increasing the value of said digit in which said first, second, third, fourth and fifth conductor means couple said bistable elements of said first means corresponding to said bit positions 1, 2, 3, 4 and 5 to said bistable elements of said second means corresponding to said bit positions 2, 3, 4, 5 and 1, respectively, said fifth conductor means transferring the bit stored at said bit position 5 of said first means to said bit position 1 of said second means inverted.

28. The apparatus of claim 25 for obtaining the 9's complement of said digit in which said first, second, third, fourth and fifth conductor means couple said bistable elements of said first means corresponding to said bit positions 1, 2, 3, 4 and 5 to said bistable elements of said second means corresponding to said bit positions 4, 3, 2, 1 and 5, respectively, said fifth conductor means transferring the bit stored at said bit position 5 of said first means to said bit position 5 of said second means inverted.

* * * * *